(12) United States Patent
Wang et al.

(10) Patent No.: US 11,483,642 B1
(45) Date of Patent: Oct. 25, 2022

(54) EARPHONE DEVICE HAVING GESTURE RECOGNITION FUNCTIONS

(71) Applicant: KaiKuTek Inc., Taipei (TW)

(72) Inventors: Mike Chun-Hung Wang, Taipei (TW); Yu Feng Wu, Zhubei (TW); Chieh Wu, Hsinchu (TW); Fang Li, New Taipei (TW); Ling Ya Huang, Chiayi (TW); Guan-Sian Wu, Taichung (TW); Wen-Jyi Hwang, Taipei (TW)

(73) Assignee: KaiKuTek Inc., Taipei (TW)

( * ) Notice: Subject to any disclaimer, the term of this patent is extended or adjusted under 35 U.S.C. 154(b) by 0 days.

(21) Appl. No.: 17/386,247

(22) Filed: Jul. 27, 2021

(51) Int. Cl.
  *H04R 1/10* (2006.01)
  *G06F 3/16* (2006.01)
  *G06F 3/01* (2006.01)

(52) U.S. Cl.
  CPC ........... *H04R 1/1041* (2013.01); *G06F 3/017* (2013.01); *G06F 3/165* (2013.01); *G06F 3/167* (2013.01); *H04R 2420/07* (2013.01)

(58) Field of Classification Search
  CPC ......... H04M 1/72412; H04M 2250/04; H04M 2250/12; H04M 2250/02; H04M 2250/06; H04M 1/72457; G10L 17/00; G10L 15/00; G10L 25/78; G10L 2021/02082; G10L 2021/02166; G10L 21/0232; G10L 21/10; H04N 5/93; H04N 7/181; H04R 1/406; H04R 2201/405; H04R 2430/03; H04R 3/005; H04L 63/0492; H04L 67/12; H04L 12/2823; H04L 2012/2849; H04L 63/08; H04L 63/0807; H04L 63/0823; H04L 63/0861; H04L 67/025; H04L 67/06;

(Continued)

(56) References Cited

U.S. PATENT DOCUMENTS

| 8,836,768 B1 * | 9/2014 | Rafii .................... G02B 27/017 |
| | | 348/47 |
| 2008/0048878 A1 * | 2/2008 | Boillot .................. G06F 3/0485 |
| | | 381/105 |

(Continued)

FOREIGN PATENT DOCUMENTS

| CN | 107430443 A | 12/2017 |
| CN | 110427151 A | 11/2019 |
| TW | 201528020 A | 7/2015 |

*Primary Examiner* — Lun-See Lao
(74) *Attorney, Agent, or Firm* — Rabin & Berdo, P.C.

(57) ABSTRACT

An earphone device having gesture recognition functions includes a gesture recognition element, a signal transmission unit, and a voice output element. The gesture recognition element includes a transmission unit, a reception chain and a processing unit. The transmission unit transmits a transmission signal to detect the gesture. The reception chain receives a gesture signal to generate a feature map data. The processing unit is coupled to the reception chain for receiving the feature map data and utilizes an identification algorithm to recognize gesture according to the feature map data to generate a gesture controlling signal. The signal transmission unit receives and transmits the gesture controlling signal to an electronic device. The processing unit receives a controlling action generated by the electronic device according to the gesture controlling signal via the signal transmission unit. The electronic device generates a voice message according to the controlling action and broadcasts the voice message.

9 Claims, 9 Drawing Sheets

(58) Field of Classification Search
CPC ..... H04L 67/10; H04L 67/1095; H04L 67/75; H04W 12/06; H04W 12/50; H04W 4/023; H04W 4/50; H04W 4/80; H04W 88/02; H04W 92/18
USPC .......................................... 381/333; 700/94
See application file for complete search history.

(56) References Cited

U.S. PATENT DOCUMENTS

| | | | |
|---|---|---|---|
| 2016/0040996 A1* | 2/2016 | Skillman | G01C 21/3664 |
| | | | 701/533 |
| 2016/0246367 A1* | 8/2016 | Tungare | G06F 3/0237 |
| 2019/0034765 A1* | 1/2019 | Kaehler | G06K 9/00 |
| 2020/0341610 A1* | 10/2020 | Quintana | G06F 3/04855 |

* cited by examiner

EARPHONE DEVICE HAVING GESTURE RECOGNITION FUNCTIONS

BACKGROUND OF THE INVENTION

1. Field of the Invention

The present invention relates to an earphone device, and more particularly, an earphone device having gesture recognition functions.

2. Description of the Related Art

An earphone is widely used as an electronic device. The earphone is utilized to output a voice message of the electronic device connected to the earphone, and the voice message includes a music message and a call message. However, for controlling the voice message, both a wired earphone and a wireless earphone must control the voice message via a physical button.

For instance, for the wired earphone, when the user desires to adjust a volume of music, the user needs to press the physical button of the wired earphone or press the physical button of the electronic device connected to the earphone. For the wireless earphone, without the physical volume button to control the voice message, the user sets the electronic device to automatically answer the call or manipulates the electronic device to adjust and control the volume of the music.

If the user is eating, hands of the user may be dirty, and may not use the hands to directly press the physical button or manipulate the electronic device. It is inconvenient for the user.

Accordingly, how to provide an earphone device to solve the problem mentioned above is an urgent subject to tackle.

SUMMARY OF THE INVENTION

To overcome the shortcomings, the present invention discloses an earphone device having gesture recognition functions. The earphone device having gesture recognition functions includes a gesture recognition element, a signal transmission unit, and a voice output element. The gesture recognition element includes a transmission unit, a reception chain and a processing unit. The transmission unit transmits a transmission signal to detect the gesture. The reception chain receives a gesture signal to generate a feature map data. The processing unit is coupled to the reception chain for receiving the feature map data and utilizes an identification algorithm to recognize gesture according to the feature map data to generate a gesture controlling signal. The signal transmission unit receives and transmits the gesture controlling signal to an electronic device. The voice output element is coupled to the signal transmission unit to output a voice message of the electronic device. The electronic device generates the voice message according to the gesture controlling signal transmitted by the signal transmission unit, and transmits the voice message to the signal transmission unit to output the voice message via the voice output element.

As mentioned above, the earphone device having gesture recognition functions provides the gesture sensing range with a large range. The earphone device having gesture recognition functions can rapidly and correctly recognize the gesture generated by the user without the affection of the changeable position of the earphone device to generate the corresponding gesture controlling signal and further control the voice message outputted by the electronic device.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Figure 1:
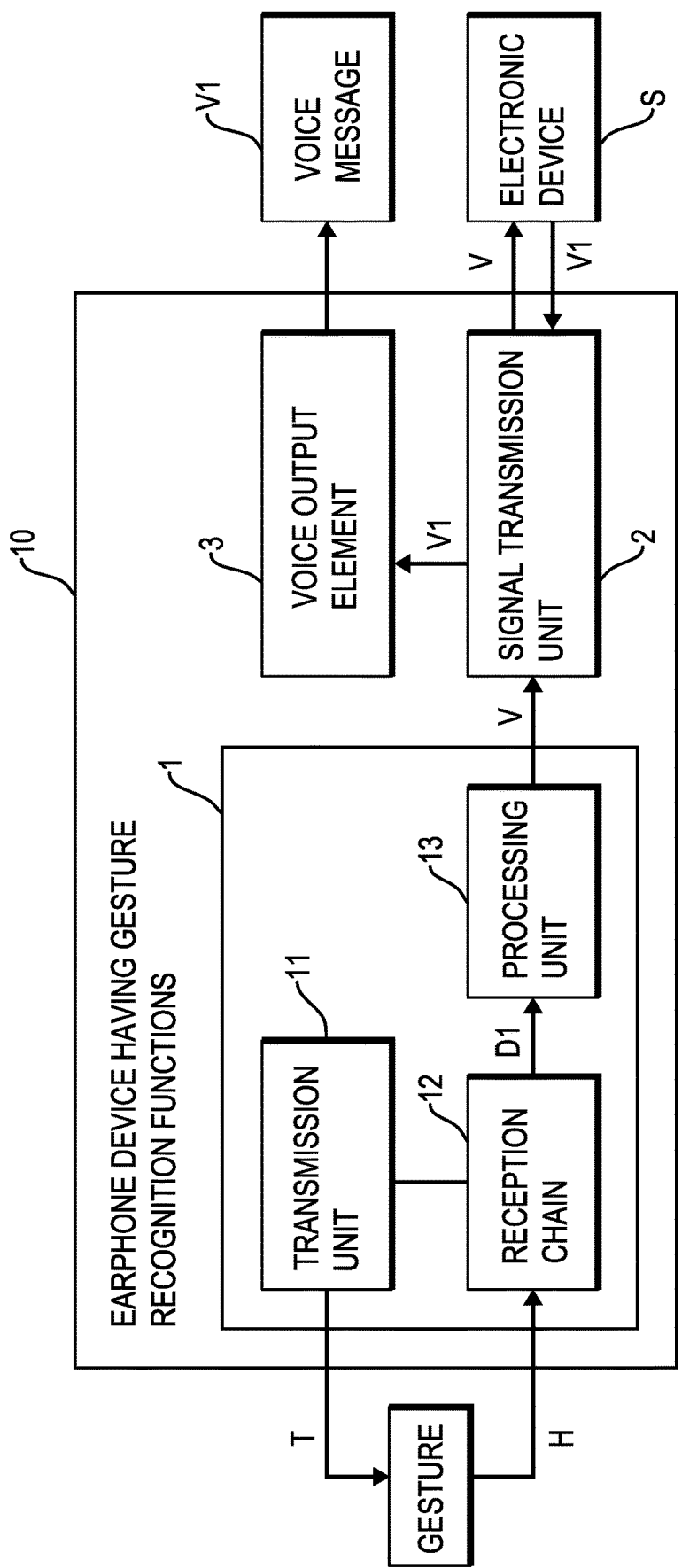
FIG. 1 is a block diagram of the earphone device having gesture recognition functions of the present invention.

Refer to FIG. 1. FIG. 1 is a block diagram of the earphone device having gesture recognition functions of the present invention. The earphone device having gesture recognition functions 10 includes a gesture recognition element 1, a signal transmission unit 2 and a voice output element 3. The gesture recognition element 1 includes a transmission unit 11, a reception chain 12 and a processing unit 13. The transmission unit 11 transmits a transmission signal T to detect the gesture. The reception chain 12 receives a gesture signal H to generate the feature map data D1 corresponding to the gesture signal H. The gesture signal H is generated by reflecting the transmission signal T from the gesture. The processing unit 13 is coupled to the reception chain 12, receives the feature map data D1, and recognizes the gesture according to the feature map data D1 by the identification algorithm to generate the gesture controlling signal V. The signal transmission unit 2 is coupled to the processing unit 13 and connected to the electronic device S, and receives and transmits the gesture controlling signal V to the electronic device S. The voice output element 3 is coupled to the signal transmission unit 2 to output a voice message V1 of the electronic device S. The electronic device S receives the gesture controlling signal V transmitted by the signal transmission unit 2, generates the voice message V1 according to the gesture controlling signal V, and transmits the voice message V1 to the signal transmission unit 2. After the signal transmission unit 2 receives the voice message V1, the voice output element 3 outputs the voice message V1 transmitted by the signal transmission unit 2.

As mentioned above, in the embodiment of the present invention, the processing unit 13 includes an Artificial Intelligence accelerator, a micro controller, and a three dimensional coordinate trace engine. The Artificial Intelligence accelerator utilizes the feature map data D1 generated by the reception chain 12 to recognize the gesture via the identification algorithm to generate a gesture recognition result. Furthermore, the feature map data D1 generated by the reception chain traces the gesture in space related to the relative position and the absolute position of the earphone device having gesture recognition functions 10 via the three dimensional coordinate trace engine to generate three dimensional information. The micro controller combines the gesture recognition result and the three dimensional coordinate information to output the gesture controlling signal V. Moreover, the corresponding relationships among the gesture recognition result, the three dimensional coordinate information and the output gesture controlling signal V are described in the following embodiments of FIG. 6A to FIG. 6E.

Furthermore, in another embodiment of the present invention, the gesture controlling signal V generated by the processing unit 13 of the earphone device having gesture recognition functions 10 includes a voice controlling signal and an active noise cancellation (ANC) signal. The signal transmission unit 2 receives and transmits the voice controlling signal to the electronic device S so that the electronic device S generates the voice message V1 according to the voice controlling signal and transmits the voice message V1 to the signal transmission unit 2. After the signal transmission unit 2 receives the voice message V1, the voice output element 3 broadcasts the voice message V1 transmitted by the signal transmission unit 2. The details will be described as below.

In addition, in another embodiment of the present invention, the gesture controlling signal V generated by the processing unit 13 of the earphone device having gesture recognition functions 10 includes an active noise cancellation (ANC) controlling signal. The signal transmission unit 2 receives the ANC controlling signal and transmits the ANC controlling signal to the voice output element 3 to abate the noise while the voice output element 3 broadcasts the voice message V1 in the background.

Furthermore, in another embodiment of the present invention, the gesture controlling signal V generated by the processing unit 13 of the earphone device having gesture recognition functions 10 includes a screenshot controlling signal. The signal transmission unit 2 receives and transmits the screenshot controlling signal to the electronic device S so that the electronic device S generates a corresponding screenshot controlling action according to the screenshot controlling signal.

Figure 2:
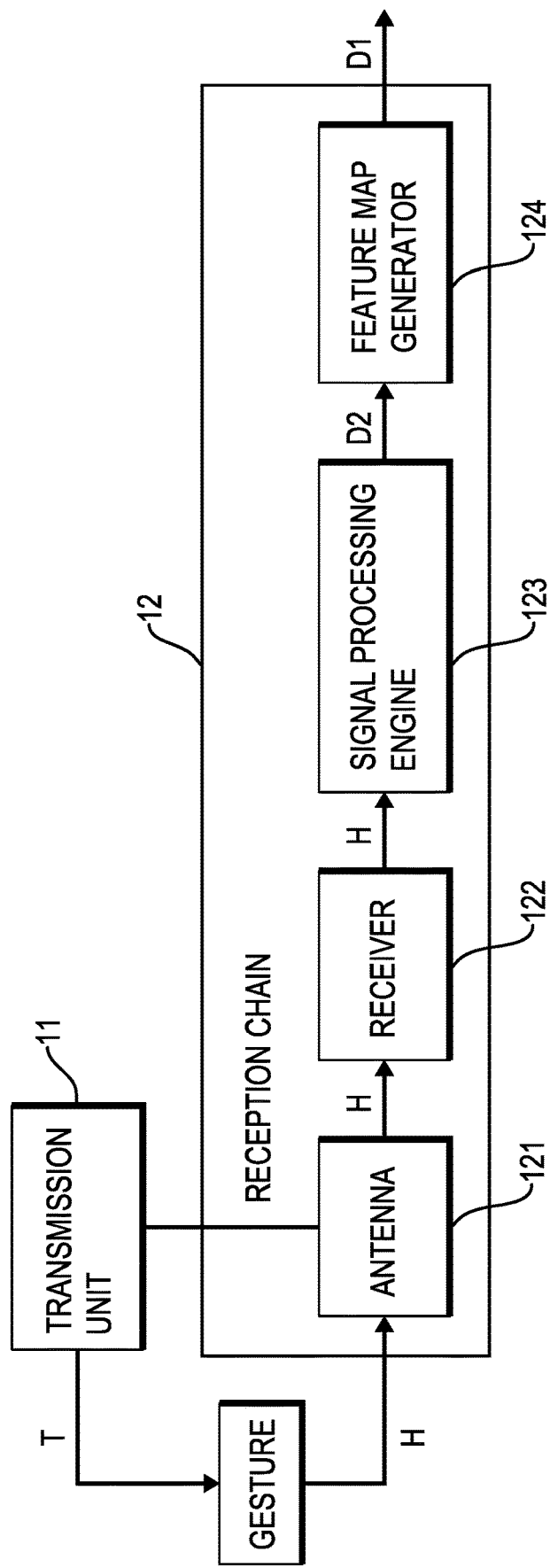
FIG. 2 is the reception chain block diagram of the earphone device having gesture recognition functions of the present invention.

Refer to FIG. 2. FIG. 2 is the reception chain block diagram of the earphone device having gesture recognition functions of the present invention. The reception chain 12 of the gesture recognition element 1 includes an antenna 121, a receiver 122, a signal processing engine 123, and a feature map generator 124. The transmission unit 11 is coupled to the antenna 121. The antenna 121 is used to receive the gesture signal H. The receiver 122 includes an input terminal and an output terminal. The input terminal is coupled to the antenna 121 and used to receive the gesture signal H. The output terminal is used to output the gesture signal H. The signal processing engine 123 is used to generate the signal processed data D2 according to gesture signal H. The signal processing engine 123 includes an input terminal and an output terminal. The input terminal is coupled to the output terminal of the receiver 122 so as to receive the gesture signal H. The output terminal is used to output the signal processed data D2. The feature map generator 124 is used to generate the feature map data D1 according to the signal processed data D2. The feature map generator 124 includes an input terminal and an output terminal. The input terminal is coupled to the output terminal of the signal processing engine 123 so as to receive the signal processed data D2. The output terminal is used to output the feature map data D1 to the processing unit 13.

Figure 3A:
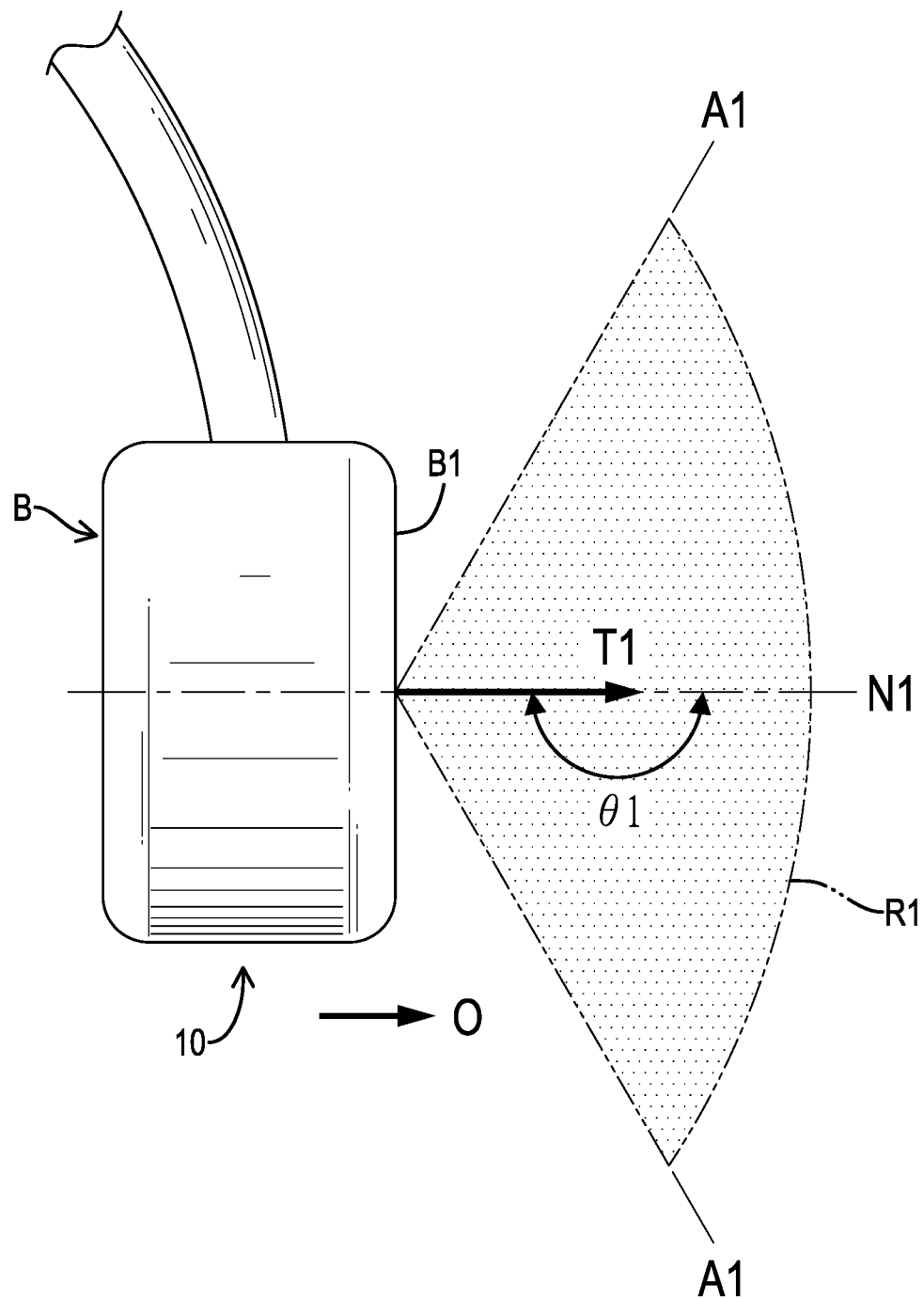
FIG. 3A to FIG. 3C are respectively schematic diagrams of the earphone device having gesture recognition functions of the present invention for the gesture detection range at different transmission signal emitting angles.
Figure 3B:
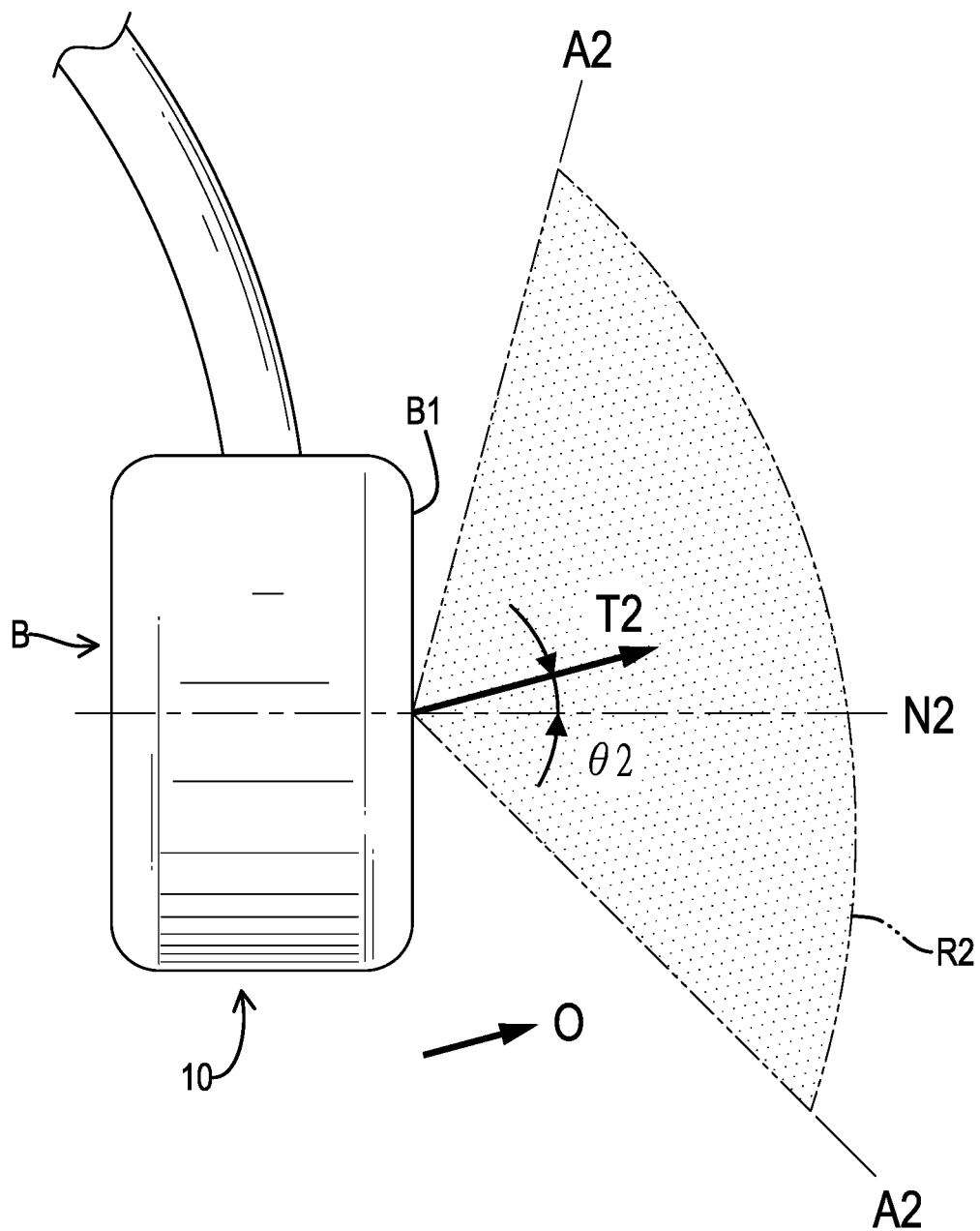
Figure 3C:
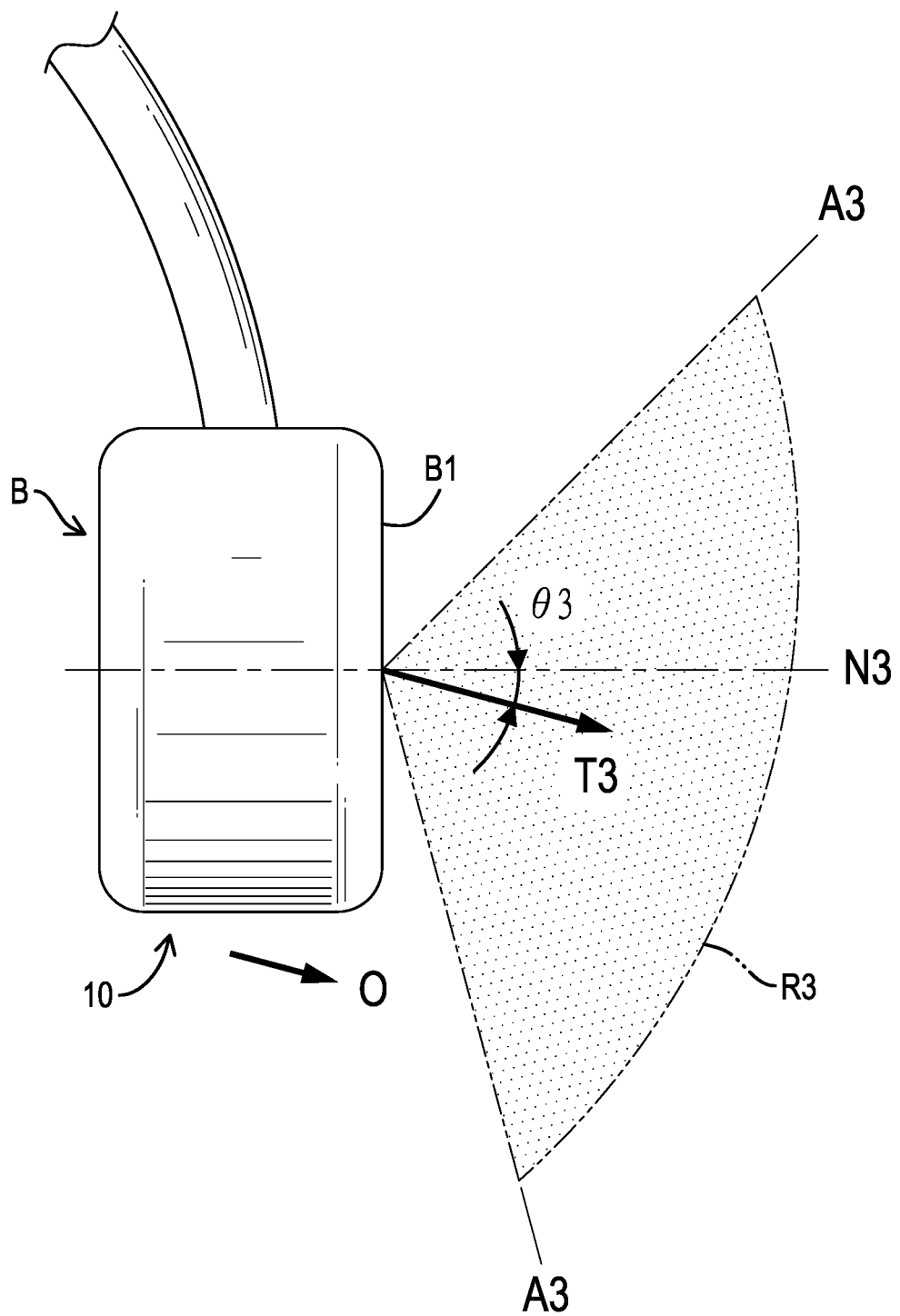

Refer to FIG. 3A to FIG. 3C. FIG. 3A to FIG. 3C are respectively schematic diagrams of the earphone device having gesture recognition functions of the present invention for the gesture detection range at different transmission signal emitting angles. As shown in FIG. 3A, the earphone device having gesture recognition functions 10 has a housing B. The housing B has an emitting surface B1 and a normal line N1. The normal line N1 is perpendicular to the emitting surface B1. The gesture recognition element 1 is disposed in the housing B. The transmission unit 11 emits the transmission signal aligned with the direction of the normal line N1 (as the direction of the arrow O). The transmission signal has an emitting direction T1 and an emitting range R1. An intersection angle θ1 (The intersection angle θ1 is 0 degree in the embodiment) is formed between the emitting direction T1 and the normal line N1 perpendicular to the emitting surface B1 of the housing B. The emitting range R1 includes the range formed by a predetermined direction angle A1 and an emitting direction T1 as a reference line.

As shown in FIG. 3B, when the gesture recognition element 1 is disposed in different positions in the earphone device so as to form the distinct emitting direction of the transmission signal T2, the range of emitting range R2 will vary with the positions. For instance, when the emitting direction of the transmission signal T2 generated by the transmission unit 11 of the gesture recognition element 1 emits toward the direction above the normal line N2, an intersection angle θ2 is formed by the emitting direction of the transmission signal T2 and the normal line N2 perpendicular to the emitting surface B1 of the housing B. The emitting range R2 is formed by a predetermined direction angle A2 and the emitting direction of the transmission signal T2 is the reference direction. In the embodiment of the present invention, the intersection angle θ2 is less than 60 degrees.

As shown in FIG. 3C, when the gesture recognition element 1 is disposed in different positions in the earphone device so as to form the distinct emitting direction of the transmission signal T3, the emitting range R3 will vary with the positions. For instance, when the emitting direction of the transmission signal T3 generated by the transmission unit 11 of the gesture recognition element 1 emits toward the direction below the normal line N3, an intersection angle θ3 is formed by the emitting direction of the transmission signal T3 and the normal line N3 perpendicular to the emitting surface B1 of the housing B. The emitting range R3 is formed by a predetermined direction angle A3 and the emitting direction of the transmission signal T3 is the reference direction. In the embodiment of the present invention, the intersection angle θ3 is less than 60 degrees.

Figure 4A:
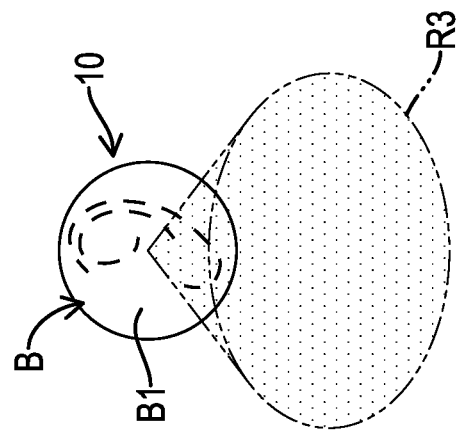
FIG. 4A to FIG. 4E are emitting range schematic diagrams of the earphone device having gesture recognition functions of the present invention for the transmission signal at different emitting angles in space.
Figure 4B:
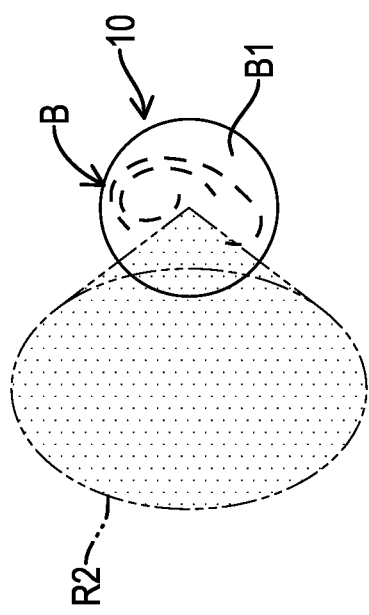
Figure 4C:
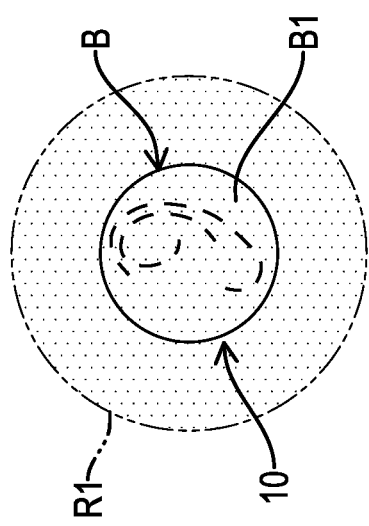
Figure 4D:
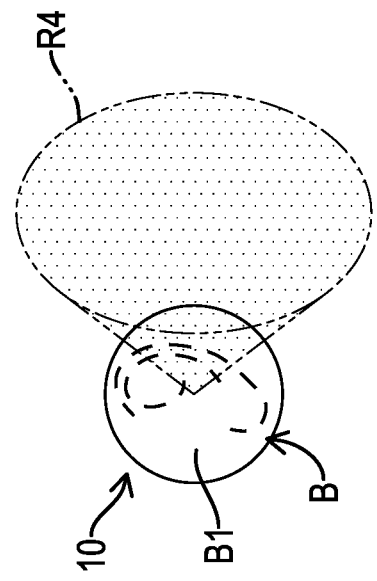
Figure 4E:
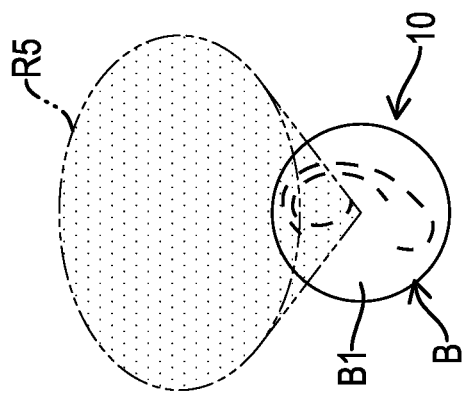

Refer to FIG. 4A to FIG. 4E. FIG. 4A to FIG. 4E are emitting range schematic diagrams of the earphone device having gesture recognition functions of the present invention for the transmission signal at different emitting angles in space. In fact, the emitting range R1, R2, R3 formed by the emitting direction of the transmission signal T1, T2, and T3 in FIG. 3A to FIG. 3C in space are radial outward. As shown in FIG. 4A, FIG. 4A shows the emitting range R1 is at the right left position of the left ear when the emitting direction of the transmission signal is perpendicular to the surface of the ear. As shown in FIG. 4B, the emitting range R2 is at the front position of the left ear when the emitting direction of the transmission signal is toward the front direction of the ear. As shown in FIG. 4C, the emitting range R3 is at the below position of the left ear when the emitting direction of the transmission signal is toward the below direction of the ear. As shown in FIG. 4D, the emitting range R4 is at the back position of the left ear when the emitting direction of the transmission signal is toward the back direction of the ear. As shown in FIG. 4E, the emitting range R5 is at the above position of the left ear when the emitting direction of the transmission signal is toward the above direction of the ear.

Figure 5B:
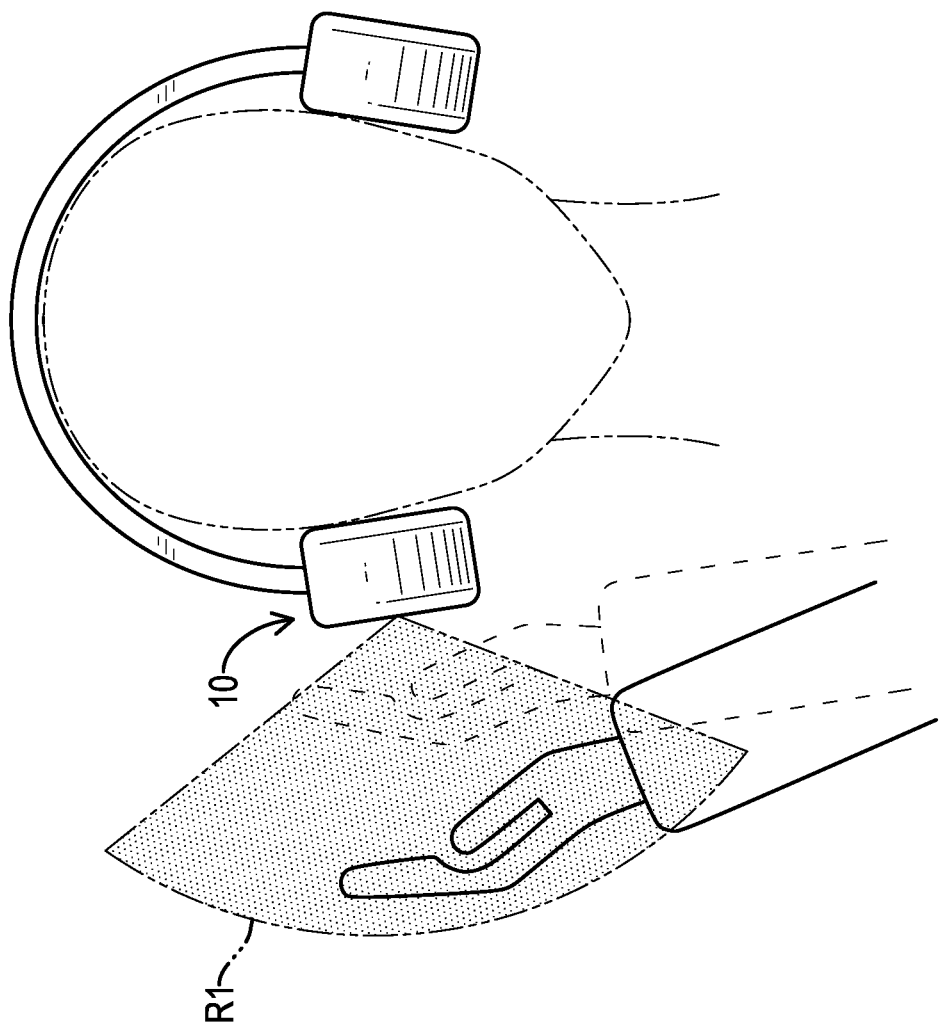
FIG. 5B is a front view of the user correctly wearing the earphone device having gesture recognition functions.
Figure 5A:
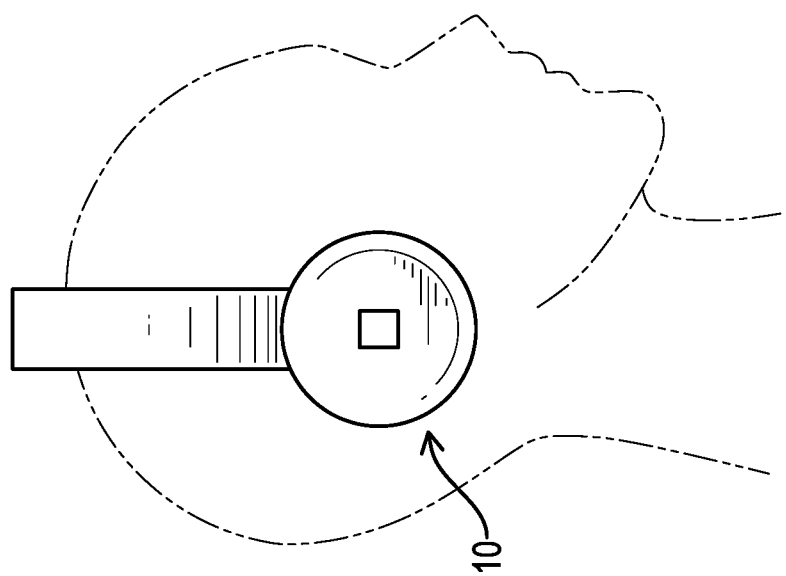
FIG. 5A is a side view of the user correctly wearing the earphone device having gesture recognition functions.

Refer to FIG. 5A and FIG. 5B. FIG. 5A is the side view of the user correctly wearing the earphone device having gesture recognition functions. FIG. 5B is the front view of the user correctly wearing the earphone device having gesture recognition functions. As shown in FIG. 5B, while the user waves his hand in the emitting range R1 formed by the emitting direction of the transmission signal T1, the earphone device having gesture recognition functions 10 can recognize the action according to the gesture of the user.

Figure 5D:
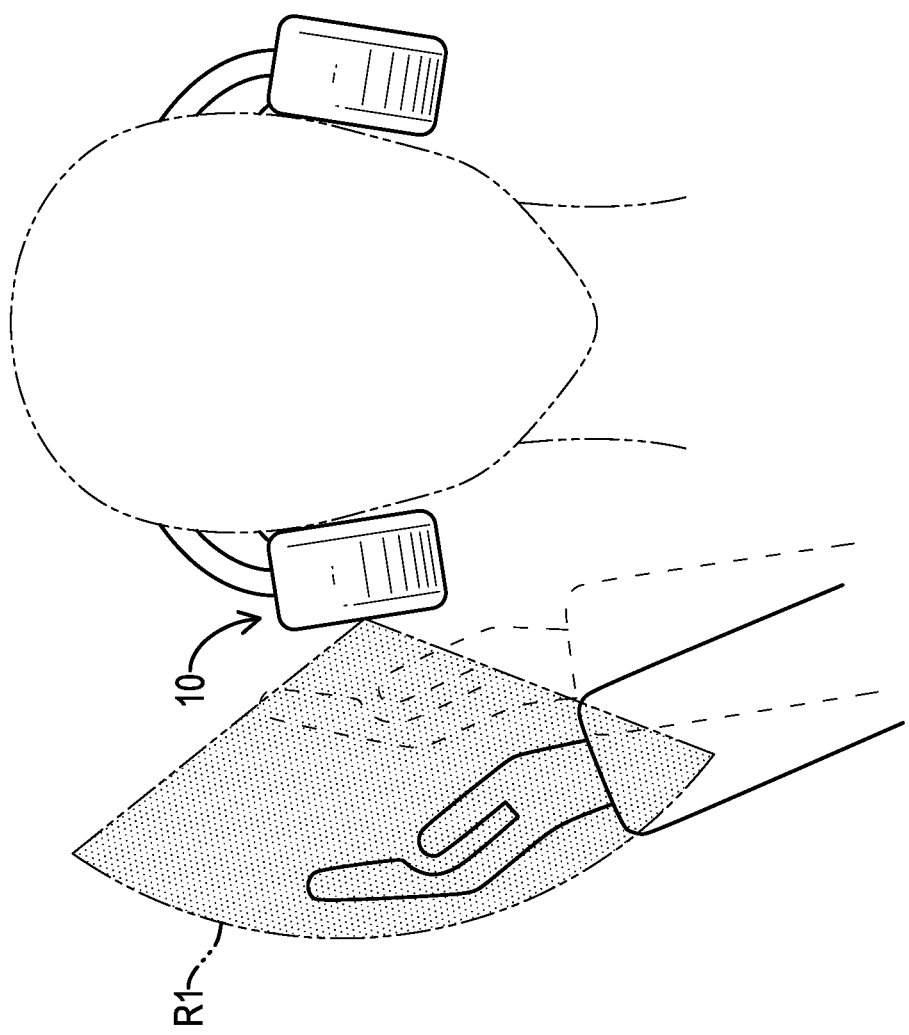
FIG. 5D is a front view of the user correctly wearing the earphone device having gesture recognition functions.
Figure 5C:
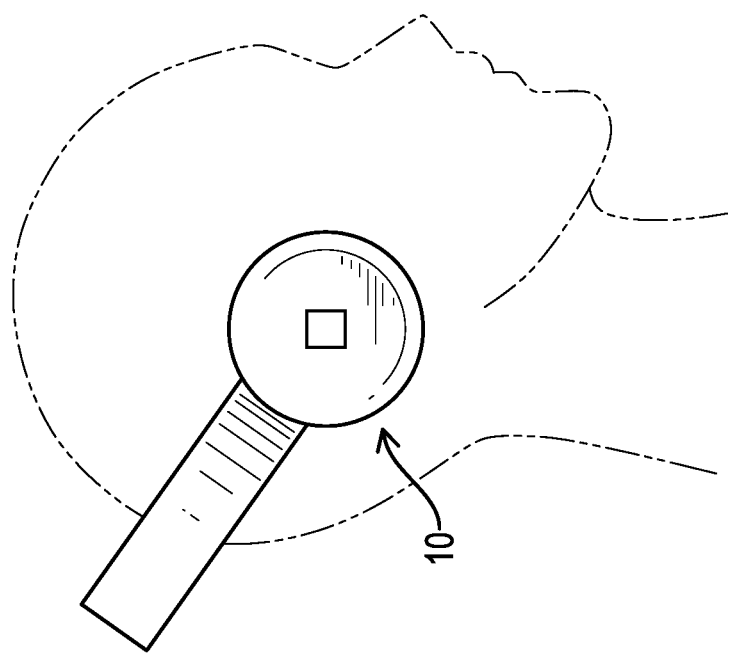
FIG. 5C is a side view of the user incorrectly wearing the earphone device having gesture recognition functions.
Figure 6A:
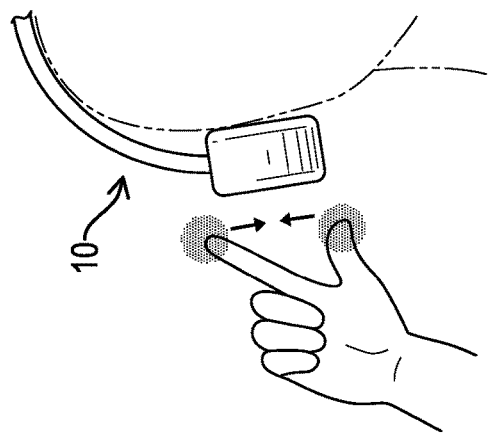
FIG. 6A to FIG. 6E are respectively gesture operational views of the earphone device having gesture recognition functions of the present invention.
Figure 6B:
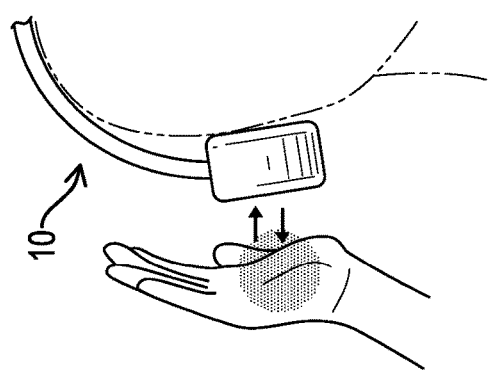
Figure 6C:
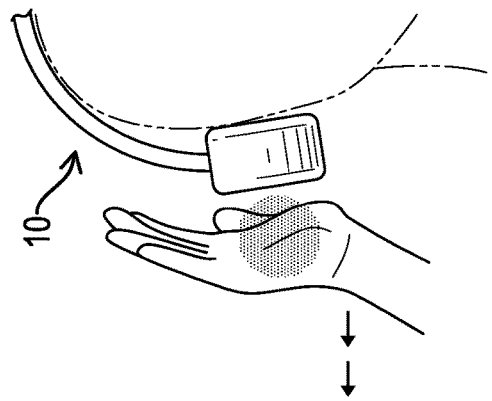
Figure 6D:
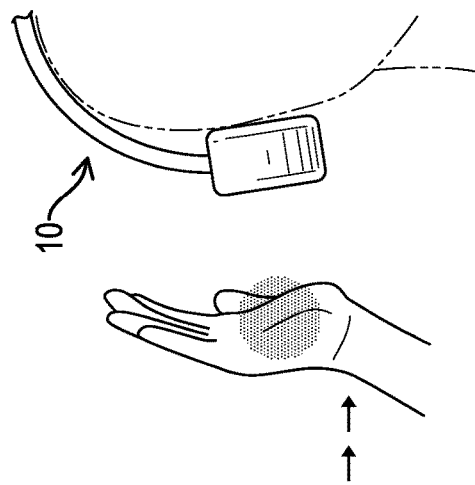
Figure 6E:
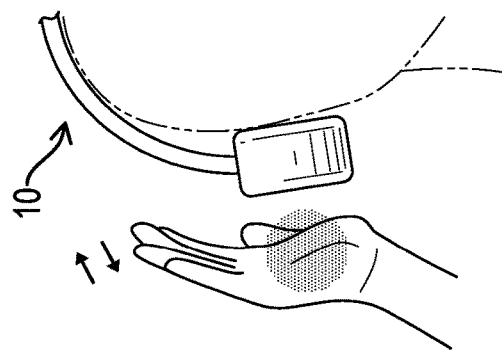

Refer to FIG. 5C and FIG. 5D. FIG. 5C is the side view for of the user incorrectly wearing the earphone device having gesture recognition functions. FIG. 5D is the front view of the user correctly wearing the earphone device having gesture recognition functions 10. In the embodiment, the difference from the above embodiment of FIG. 5A and FIG. 5B is the angle on the head of the earphone device having gesture recognition functions 10 that the user wears. In FIG. 5C and FIG. 5D, although the user incorrectly wears the earphone device having gesture recognition functions 10, the emitting direction of the transmission signal T1 is perpendicular to the emitting surface B1 of the housing B. Hence, even the earphone device having gesture recognition functions 10 fails to be worn correctly by the user, the emitting range R1 formed by the emitting direction of the transmission signal T1 maintains a constant range.

Refer to FIG. 6A to FIG. 6E. FIG. 6A to FIG. 6E are respectively the gesture operational views of the earphone device having gesture recognition functions of the present invention. The gestures include a gesture of pinching a finger, a gesture of continuous patting the earphone device, a gesture from near to far, a gesture from far to near, a gesture of waving up and down, and a gesture of waving back and forth. Each gesture in the three dimensional coordinate respectively corresponds to generate a gesture controlling signal V. The gesture controlling signal V includes a controlling signal of broadcasting a music controlling signal, a controlling signal of turning off a music controlling signal, a controlling signal of adjusting a music volume, a controlling signal of answering incoming calls, and a controlling signal of stopping a call. The gesture controlling signals corresponding to the gesture controlling signal V can be determined by the user but not limited thereto in the present invention.

In an embodiment of the present invention, the earphone device having gesture recognition functions 10 includes a wearable earphone, an ear-plug earphone, a single-ear earphone, a double-ear earphone, a wireless earphone and a wired earphone.

In an embodiment of the present invention, the signal transmission unit 2 is a Bluetooth transmission unit. That is, the earphone device having gesture recognition functions 10 utilizes the Bluetooth technology to transmit, receive, and sense the aforementioned signal and data. Furthermore, the signal transmission unit 2 can be a transmission line, connected to the electronic device S.

In an embodiment of the present invention, the electronic device S includes an intelligent device. The intelligent device includes a smart phone, a tablet, and a computer device with the Bluetooth transmission unit to output the voice message V1 generated by the electronic device S. The voice message V1 includes music information, telephone information, voice information, video information, and message information. Besides, the music information includes various song information, which can be set by the user according to the above gestures to play the next song, to play the previous song, and to pause the current song. The video information includes sound effect and voice information, which can be set by the user according to the above gestures to play the corresponding video and to pause the video. The telephone information includes calling information, dialing information, and answering the phone information. The user can set the calling, dialing, and answering actions according to the aforementioned gestures. The voice information includes call message information. The user can set the action of calling message information according to the aforementioned gestures. Message information includes text message information of the phone. The user can broadcast the text message via the voice output element 3 according to the aforementioned gestures.

Furthermore, in an embodiment of the present invention, the earphone device having gesture recognition functions 10 further includes a frequency synthesizer (not shown in FIG). The frequency synthesizer is used to provide a reference oscillation signal to the receiver 122 of the reception chain 12 so that the reception chain 12 can adjust the gesture signal H according to the reference oscillation signal.

In summary, the earphone device having gesture recognition functions provides the gesture sensing range of a wide range. The earphone device having gesture recognition functions can rapidly and correctly recognize the gesture generated by the user without the affection of the changeable position of the earphone device to generate the corresponding gesture controlling signal and further control the voice message outputted by the electronic device S.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An earphone device, having gesture recognition functions, comprising:
    a gesture recognition element, comprising:
        a transmission unit, transmitting a transmission signal to detect a gesture;
        a reception chain, receiving a gesture signal to generate a feature map data corresponding to the gesture signal, wherein the gesture signal is generated by reflecting the transmission signal from the gesture; and
        a processing unit, coupled to the reception chain, receiving the feature map data, and utilizing an identification algorithm to recognize the gesture according to the feature map data to generate a gesture controlling signal;

a signal transmission unit, receiving and transmitting the gesture controlling signal to an electronic device; and a voice output element, coupled to the signal transmission unit to output a voice message of the electronic device;

wherein the electronic device generates the voice message according to the gesture controlling signal transmitted by the signal transmission unit, and transmits the voice message to the signal transmission unit to output the voice message via the voice output element.

2. The earphone device having gesture recognition functions as claimed in claim 1, wherein the reception chain comprises:

an antenna, receiving the gesture signal;

a receiver, including:
   an input terminal, coupled to the antenna, and receiving the gesture signal; and
   an output terminal, outputting the gesture signal;

a signal processing engine, generating a signal processed data according to the gesture signal, comprising:
   an input terminal, coupled to the output terminal of the receiver, and receiving the gesture signal; and
   an output terminal, outputting the signal processed data; and a feature map generator, generating the feature map data according to the signal processed data, comprising:
   an input terminal, coupled to the output terminal of the signal processing engine, and receiving the signal processed data; and
   an output terminal, outputting the feature map data to the processing unit.

3. The earphone device having gesture recognition functions as claimed in claim 1, wherein the earphone device comprises a wearable earphone, an ear-plug earphone, a single-ear earphone, a double-ear earphone, a wireless earphone and a wired earphone.

4. The earphone device having gesture recognition functions as claimed in claim 1, wherein the gestures comprise a gesture of pinching a finger, a gesture of continuous patting the earphone device, a gesture from near to far, a gesture from far to near, a gesture of waving up and down, and a gesture of waving back and forth.

5. The earphone device having gesture recognition functions as claimed in claim 1, wherein the signal transmission unit is a Bluetooth transmission unit.

6. The earphone device having gesture recognition functions as claimed in claim 1, wherein the gesture controlling signal comprises a controlling signal of broadcasting a music controlling signal, a controlling signal of turning off a music controlling signal, a controlling signal of adjusting a music volume, a controlling signal of answering incoming calls, and a controlling signal of stopping a call.

7. The earphone device having gesture recognition functions as claimed in claim 1, further comprising:

a housing, having an emitting surface, wherein a normal line of the emitting surface is perpendicular to the emitting surface, the transmission unit transmits the transmission signal aligned with the normal line, and the transmission signal has an emitting range.

8. The earphone device having gesture recognition functions as claimed in claim 1, comprising:

a housing, having an emitting surface, wherein a normal line of the emitting surface is perpendicular to the emitting surface, the transmission signal has a emitting direction, and an intersection angle is formed between the emitting direction and the normal line.

9. The earphone device having gesture recognition functions as claimed in claim 8, wherein the intersection angle is smaller than 60 degrees.

* * * * *